United States Patent [19]

Yoshida et al.

[11] Patent Number: 5,272,648
[45] Date of Patent: Dec. 21, 1993

[54] METHOD OF DETECTING A POSITION OF A ROBOT

[75] Inventors: Mitsutoshi Yoshida; Takashi Miyata, both of Nagoya, Japan

[73] Assignee: Mitsubishi Jukogyo Kabushiki Kaisha, Tokyo, Japan

[21] Appl. No.: 864,297

[22] Filed: Apr. 6, 1992

Related U.S. Application Data

[63] Continuation of Ser. No. 561,368, Aug. 1, 1990, abandoned, which is a continuation of Ser. No. 191,417, May 9, 1988, abandoned.

[30] Foreign Application Priority Data

May 20, 1987 [JP] Japan ................. 62-121079

[51] Int. Cl.$^5$ ................. G01D 21/00; B65G 47/22
[52] U.S. Cl. ................. 364/559; 414/591; 414/744.2; 377/17
[58] Field of Search ............. 364/559, 556; 414/591, 414/744.2, 744.3; 377/3, 5, 17, 19, 20; 318/636; 328/133; 901/14–18; 395/80

[56] References Cited

U.S. PATENT DOCUMENTS

| | | | |
|---|---|---|---|
| 3,768,022 | 10/1973 | Lang | 328/133 |
| 3,778,833 | 12/1973 | Castrovillo et al. | 377/17 |
| 3,816,712 | 6/1974 | Herzog | 377/43 |
| 3,870,941 | 3/1975 | Ikenga et al. | 318/636 |
| 3,951,271 | 4/1976 | Mette | 414/591 |
| 4,119,212 | 10/1978 | Flemming | 414/5 |
| 4,606,696 | 8/1986 | Slocum | 414/744.2 |
| 4,697,168 | 9/1987 | Baker | 364/559 |

FOREIGN PATENT DOCUMENTS 0109296 5/1984 European Pat. Off. .

*Primary Examiner*—Vincent N. Trans
*Attorney, Agent, or Firm*—McAulay Fisher Nissen Goldberg & Kiel

[57] ABSTRACT

There is disclosed a position detection method of a robot which provides two incremental position transducers mounted to a robot axis in interlocked relationship with each other and rotatably to produce pulse signals having the number different from each other in response to a moving distance of the moving robot axis and detects a difference between the numbers of pulses produced from the position transducers to detect the position of the robot. Further, a difference ($P_{2i}$) of the pulse number between reference pulses produced from the two position transducers at any position of the moving robot axis is calculated and the pulse number (i) of a next reference pulse from a reference position is then calculated on the basis of $i=(P_1-P_{2i})/(P_1-P_2)$ where $P_1$ and $P_2$ are the numbers of pulses produced during one rotation of the position transducers, respectively, so that $P_1 \times i$ is calculated to detect a position of the robot axis. Accordingly, the moving distance necessary for detection of the reference point can be greatly shortened to less than two rotations of the position transducer and the time required for detection of the reference point can be also greatly reduced.

2 Claims, 4 Drawing Sheets

METHOD OF DETECTING A POSITION OF A ROBOT

This is a continuation of application Ser. No. 561,368 filed Aug. 1, 1990, now abandoned, which is in turn a continuation of Ser. No. 191,417 filed May 9, 1988, now abandoned.

FIELD OF THE INVENTION AND RELATED ART STATEMENT

The present invention relates to a method of detecting a position of a robot and which is applied to a robot, a manipulator, a machine tool, a transportation machine and the like.

FIG. 4 shows an example of a conventional position detection mechanism of a robot, in which numeral 1 denotes a robot axis which is driven by an actuator not shown in accordance with a command from a controller 5 including a central processor unit (CPU), numeral 2 denotes an incremental position transducer which is mounted to the robot axis to produce pulse signals in response to movement of the robot axis, numeral 3 denotes a reference point detector which is disposed at a reference position to produce a detection signal indicative of a reference point for measurement of a position of the robot when the robot axis 1 is detected at the reference position, numeral 4 denotes a position counter which counts pulse signals produced from the position transducer 2, and numeral 5 denotes a controller which initializes the position counter 4 when the reference point detection signal produced from the reference point detector 3 is supplied to the controller 5 and which controls the robot axis 1.

In the above conventional position detection mechanism of the robot, when the robot is used, the position of the robot axis 1 is not known only by turning on a power source. Accordingly, after turning on the power source, the robot axis 1 is first moved to the reference point detector 3 and when the detector 3 detects the robot axis 1 the detector 3 produces the detection signal which is supplied to the controller 5. The controller 5 initializes the position counter 4 in response to the detection signal. When the position counter 4 is initialized, the pulse signals produced from the position transducer 2 are counted by the position counter 4 of which a count is increased or decreased with regard to the initialized value so that the position of the robot axis 1 can be detected.

The above description has been made to one robot axis 1 of the conventional robot, while the similar operation is made to all of the robot axis 1.

However, in the case where the conventional position detection mechanism of the robot uses an incremental pulse generator as the position transducer, the position information of the robot axis 1 disappears upon turning off of a control power source of the robot and it is difficult to control the robot. Consequently, each time the control power source of the robot is turned on, it is necessary to move the robot axis 1 to the reference point detector 3 and initialize the position counter 4. Accordingly, there is a practical problem that it takes several minutes for each operation to detect the reference point. Further, since the robot axis 1 is once returned to the reference point detector 3 automatically by the detection operation of the reference point regardless of the stop position of the robot axis 1, if there is any obstacle between the robot axis 1 and the reference point detector 3 the robot axis 1 may collide against the obstacle.

In order to solve the above problem, Japanese Patent Application No. 218942/1982 discloses two incremental encoders which are interlocked with each other by a mechanism employing gears each having the number of teeth slightly different from each other and each of which is adapted to produce a zero signal simultaneously only one time within an operation range of an follower of the robot axis. A position in which the zero signals are produced from the encoders simultaneously is defined as a point of origin for the machine. Thus, the point of origin for the machine is detected by detecting the position, while even such method is not sufficient as detection means of the point of origin.

OBJECT AND SUMMARY OF THE INVENTION

It is an object of the present invention to solve the above problem and provide a position detection method of a robot which can greatly reduce a detection time of a reference position and a preparatory time of operating a robot even if an incremental pulse generator is used as a position transducer.

It is another object of the present invention to provide a position detection method of a robot which can greatly reduce a moving distance of a robot axis necessary for detection of a position of the robot even if the incremental pulse generator is used as a position transducer to improve the safety in detection of a reference point.

In order to achieve the above objects, there is provided a position detection method of a robot characterized by providing two incremental position transducers mounted to a robot axis in interlocked relationship with each other and rotatably to produce pulse signals having the number different from each other in response to a moving distance of the moving robot axis, calculating a difference ($P_{2i}$) of the pulse number between reference pulses produced from said two position transducers at any position of the moving robot axis, calculating the pulse number (i) of a next reference pulse from a reference position on the basis of $i=(P_1-P_{2i})/(P_1-P_2)$ where $P_1$ and $P_2$ are the numbers of pulses produced during one rotation of said position transducers, respectively, and calculating $P_1 \times i$ to detect a position of the robot axis.

Accordingly, in the position detection method of the robot as described above, the two incremental position transducers disposed rotatably in interlocked relationship with the moving robot axis are caused to produce pulses of different number in accordance with the moving distance of the robot axis. Reference pulses can be detected at any position of the robot axis moved over a short distance to calculate the position of the robot axis on the basis of the number of pulses between the reference pulses immediately. Accordingly, the moving distance necessary for detection of the reference point can be shortened to less than two rotations of the position transducers greatly and the time necessary for the detection of the reference point can be also reduced greatly.

As described above, according to the present invention, the preparatory time of operating the robot can be reduced and the moving distance of the robot axis necessary for the position detection can be shortened to improve the safety in detection of the reference point.

DETAILED DESCRIPTION OF A PREFERRED EMBODIMENT

An embodiment of the present invention is now described with reference to the drawings.

Figure 1:
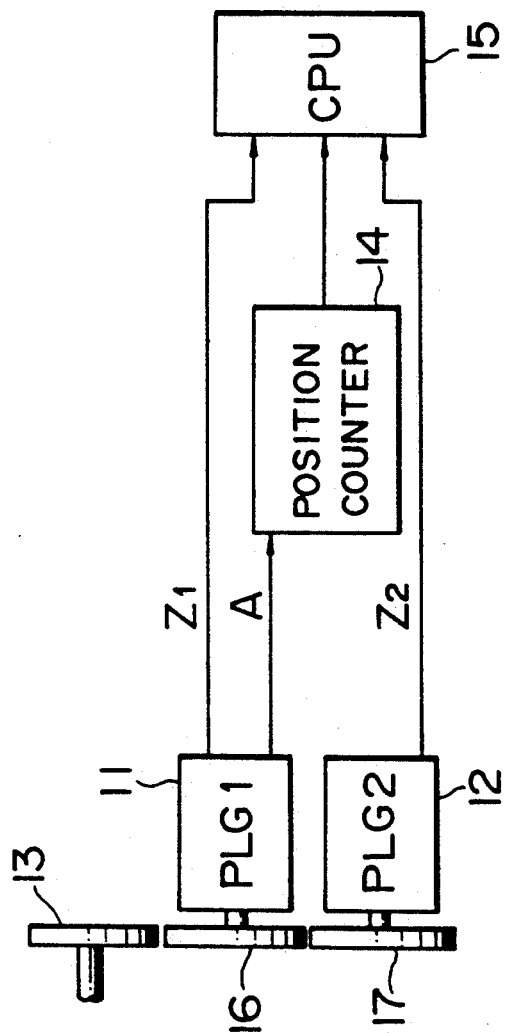
FIG. 1 is a block diagram showing an embodiment for explaining the position detection method of the robot according to the present invention.

FIG. 1 shows a configuration of the position detection mechanism of the robot. In FIG. 1, numeral 13 denotes a drive shaft of a position transducer which rotates in response to movement of a robot axis not shown. A gear mounted to the drive shaft 13 is meshed with a first reduction gear 16 and is then meshed with a second reduction gear 17 through the first reduction gear 16 having the number of teeth different from that of the second reduction gear 17. A first incremental position transducer (PLG1) 11 is mounted to a rotating shaft of the first reduction gear 16 and a second incremental position transducer (PLG2) 12 is also mounted to a rotating shaft of the second reduction gear 17. The first and second position transducers 11 and 12 are adapted to produce pulse signals having a different number in accordance with a moving distance of the robot axis on the basis of a difference between the numbers of teeth of the first and second reduction gears 16 and 17. Further, numeral 14 denotes a position counter which counts pulses A produced from the first position transducer 11 each time the transducer 11 rotates by a predetermined angle (if the transducer 11 produces one pulse for each 10 degrees, for example, the transducer 11 produces 36 pulses per one rotation). Numeral 15 denotes a controller including a CPU which is supplied with reference pulses $Z_1$ and $Z_2$ produced from the first and second position transducers 11 and 12, respectively, and a count of the pulses A counted by the position counter 14. When the controller 15 detects the supply of the reference pulses $Z_1$ and $Z_2$ from the first and second position transducer 11 and 12 and the pulses A from the first position transducers 11, the controller 15 initializes the position counter 14 and at the same time the controller 15 performs a predetermined calculation on the basis of the reference pulses $Z_1$ and $Z_2$ and the pulses A to detect a moving position of the robot axis. In this case, the reference pulses $Z_1$ and $Z_1$ of the first and second position transducers 11 and 12 are caused to previously coincide with a reference position of the robot axis.

Figure 2:
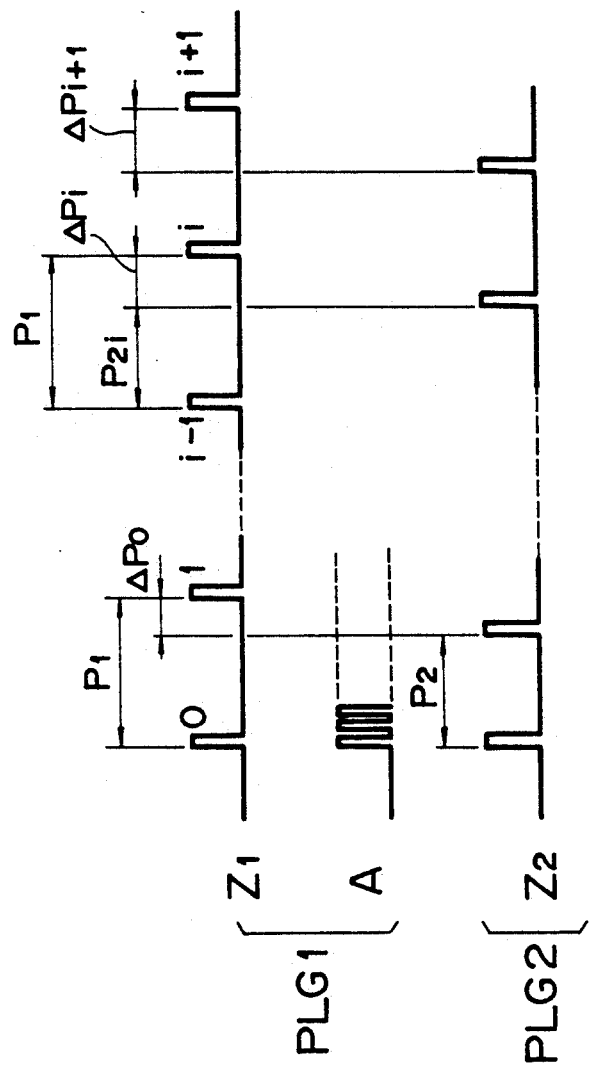
FIG. 2 is a timing chart for explaining operation of the embodiment of FIG. 1.

Operation of the position detection mechanism of the robot configured as above is described with reference to a timing chart shown in FIG. 2 and a flowchart shown in FIG. 3. When the robot axis is moved to any position after turning on a power source, the drive shaft 13 rotates in response to the movement. When the drive shaft 13 is rotated, the first position transducer 11 is rotated through the first reduction gear 16 and the second position transducer 12 is also rotated through the second reduction gear 17 so that the first and second position transducers 11 and 12 produce the reference pulses $Z_1$ and $Z_2$ at the timing shown in FIG. 2. When the reference pulses $Z_1$ and $Z_2$ are supplied to the controller 15 and at the same time a count of the pulses A produced from the first position transducer 11 and counted by the position counter 14 is read in the controller 15, the controller 15 performs the following operation to detect the position of the robot axis.

Figure 3:
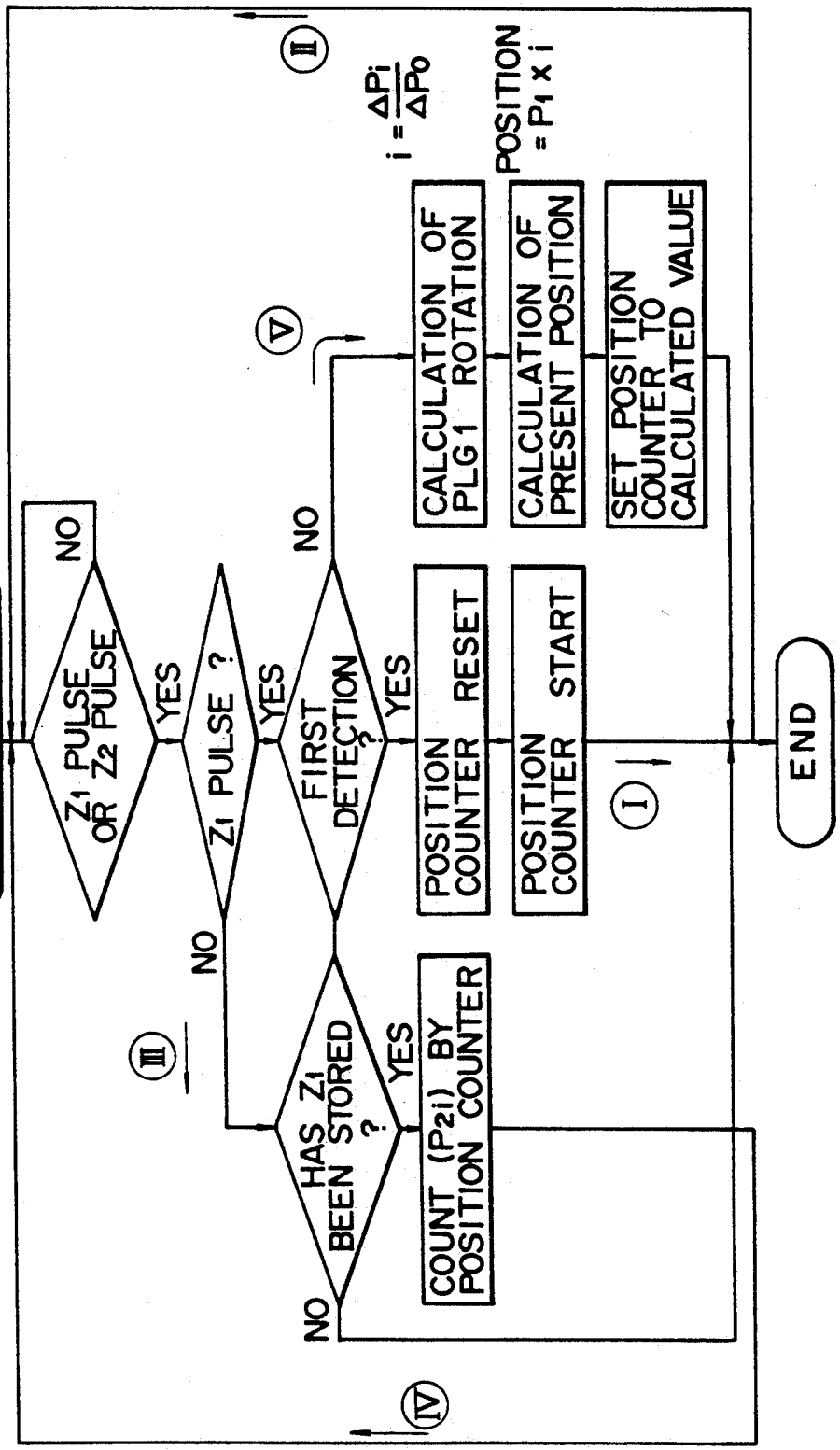
FIG. 3 is a flowchart for explaining operation of the embodiment of FIG. 1.
Figure 4:
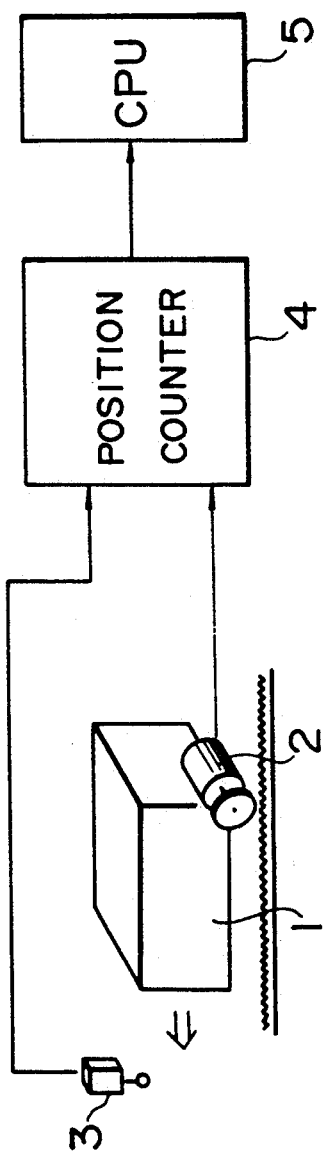
FIG. 4 is a block diagram showing a conventional position detection mechanism of the robot.

At the same time when the robot axis begins to move, the controller begins to detect the reference pulses $Z_1$ of the first position transducer 11 as shown in flow of ①→ II of FIG. 3. It is assumed that the rotational number from the reference position of the first position transducer 11 at the time when the reference pulse $Z_1$ has been first detected is $i-1$ and that the count of the position counter 14 until the first reference pulse $Z_2$ read in flow of III→IV of FIG. 3 is detected after detection of the pulses $Z_1$ for the (i−1)th rotation as shown in FIG. 2 is $P_{2i}$. Thus, the rotational number i of the reference pulses $Z_1$ from the reference position is calculated by $i = \Delta Pi/\Delta Po = (P_1 - P_{2i})\Delta Po$ as shown in flow of ⓥ of FIG. 3. Accordingly, the position of the robot axis upon detection of the second reference pulse $Z_1$ can be calculated by $$\text{Position of Robot Axis} = P_1 \times i$$

In this case, when the controller 15 has detected the second reference pulse $Z_1$, the count ($P_1 \times i$) of the position counter 14 is initialized to the robot position calculated above.

Thereafter, the position counter 14 counts the pulses A produced from the first position transducer 11 in response to the movement of the robot axis to add or subtract the count to the initial value of the counter 14 so that the result of the addition or subtraction expresses the position of the robot.

As described above, in the embodiment, the first and second incremental position transducers 11 and 12 are mounted to each of the shafts of the first and second reduction gears 16 and 17 which are sequentially coupled with the drive shaft 13, which is driven in response to the movement of the robot axis, through the respective gears having the number of teeth different from each other. The reference pulses produced from each of the first and second position transducers 11 and 12 each time the first and second position transducers 11 and 12 make one revolution are supplied to the controller 15 and the pulses A produced from the first position transducer 11 each time the first position transducer 11 is rotated at a predetermined angle are counted by the position counter 14 to supply the count to the controller 15. Consequently, the controller 15 calculates the difference ($P_{2i}$) of the pulse number between the reference pulses of the first and second position transducers 11 and 12 at any position of the robot axis and then calculates the pulse number (i) of a next reference pulse from the reference position on the basis of $i = (P_1 - P_{2i})/(P_1 - P_2)$ so that the position of the robot axis is obtained from $P_1 \times i$.

Accordingly, the method of detecting the position of the robot axis by using the incremental position transducer can greatly reduce the moving distance necessary for detection of the reference point to less than two rotations of the position transducer. Thus, the time required to detect the reference point can be also greatly reduced and the preparatory time for operating the robot can be reduced. Further, since the moving distance necessary for detection of the position of the robot axis can be shortened greatly, the safety in the detection of the reference point can be improved.

In the embodiment, description has been made to one robot axis of the robot, while it is a matter of course that the similar configuration is applied to all of the robot axes of the robot.

As describe above, according to the present invention, there can be provided the position detection method of the robot which can reduce the preparatory time for operating the robot and greatly shorten the moving distance of the robot axis necessary for the position detection to improve the safety in the detection of the reference point since the detection time of the reference position can be greatly reduced even if the incremental pulse generator is employed as the position transducer.

We claim:

1. A method of operating a robot including the detecting of a position of the robot, comprising the following steps:

moving the robot to move and rotate first and second incremental position transducers respectively and to cause one of said two incremental transducers to particularly produce finely divided pulses according to the movement of the robot and indicating the distance of said movement with a counter;

causing the first incremental position transducer upon its movement to produce first successive pulses or a first pulse train ($Z_1$) having an interval corresponding to $P_1$ counts of said finely divided pulses and said incremental second position transducer upon its movement to produce second successive pulses or a second pulse train ($Z_2$) having an interval corresponding to $P_2$ counts less than $P_1$ counts;

reference pulses of said first and second pulses ($Z_1$ and $Z_2$) being previously made coincident with a reference position of the robot, and when the current position of the robot is to be detected, moving the robot for some distance to an arbitrary position;

with a controller, detecting the initial pulse of said first pulses ($Z_1$) and then reading in a difference of $P_{2i}$ counts of said finely divided pulses between said initial pulse of said first pulses ($Z_1$) and that of said second pulses ($Z_2$) with said counter, and subsequently calculating the pulse number (i) from said reference pulse of said first pulses ($Z_1$) as $$i=(P_1-P_{2i})/(P_1-P_2),$$

so that said position of the robot is obtained as ($P_1 \times i$) counts; and said ($P_1 \times i$) counts is initialized on said counter by means of said controller and then the current position of the robot is indicated on said counter; and operating said robot based on said current position whereby said method provides a reduction of time necessary to initially operate the robot.

2. The method of claim 1 including the step of providing said first and second incremental position transducers so as to be mounted to an axis of the robot in interlocked relationship.